United States Patent Office 3,284,499
Patented Nov. 8, 1966

3,284,499
N-[4 - (2,4 - DINITROANILINO)PHENYL] ALKANE- AND ARENESULFONAMIDES AND N-[4-(2,4-DI-NITROPHENYLIMINO) - 2,5 - CYCLOHEXADIEN-YLIDENE] ALKANE- AND ARENESULFONA-MIDES
Joseph E. Dunbar, Midland, Mich., assignor to The Dow Chemical Company, Midland, Mich., a corporation of Delaware
No Drawing. Filed Nov. 2, 1964, Ser. No. 408,320
6 Claims. (Cl. 260—556)

The present invention is directed to the novel substituted sulfonamides having the formula

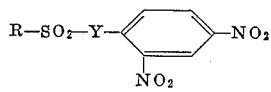

In this and succeeding formulae, R represents lower alkyl, phenyl, halophenyl or lower-alkyl phenyl and Y represents a 2,5-cyclohexadien-1,4-ylenedinitrilo

p-phenylenediimino

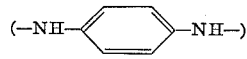

or monohalo-p-phenylenediimino. In the present specification and claims, the term halo is employed to designate chlorine and bromine and the term lower-alkyl to designate an alkyl group containing up to and including 4 carbon atoms. The compounds of the present invention are crystalline solids which are of low solubility in water and of moderate solubility in many common organic solvents. These new compounds have been found to be useful as dyes and particularly useful for dyeing polyolefin materials such as polyethylene. The compounds have also been found to be useful as pesticides for the killing and control of various insects, arachnids, helminth and crustacean organisms such as cockroaches, mites, daphnia, etc.

The compounds of the present invention wherein Y represents p-phenylenediimino can be prepared by reacting a substituted sulfonyl chloride having the formula $$R-SO_2-Cl$$

with a 2,4-dinitro-4'-aminodiphenylamine. The reaction is carried out in the presence of a hydrogen halide acceptor such as a teritary amine base, and conveniently in the presence of an inert organic liquid as reaction medium. Representative organic liquids include chloroform, benzene, toluene and xylene. The reaction is somewhat exothermic and proceeds readily at temperatures of from −10 to 50° C. with the formation of the desired product and the amine hydrohalide of reaction. The temperature can be controlled by regulating the rate of contacting the reactants and/or by external cooling.

The amounts of the reactants to be employed are not critical, some of the desired N-[4-(2,4-dinitro-anilino)phenyl]sulfonamide product being formed upon contacting the reactants in any proportion. However, the reaction consumes the substituted sulfonyl halide, tertiary amine base and 2,4-dinitro-4'-aminodiphenylamine reactant in substantially equimolar proportions and the use of the reactants in such proportions is preferred. Representative tertiary amine bases include pyridine, lutidine, picoline, collidine and quinoline.

In carrying out the reaction, the reactants can be combined together in the presence of an inert organic liquid as reaction media. In an alternative procedure, the reaction can be carried out in an excess of the tertiary amine base as reaction medium. Following the contacting of the reactants, the reaction mixture is maintained at a temperature of from −10 to 50° C. for a short period of time to insure completion of the reaction. Upon completion of the reaction period, the reaction mixture is washed with water to remove the amine hydrohalide of reaction. During the washing procedure, the product separates as a crystalline solid or a heavy oil which solidifies upon standing. This product can be employed in pesticidal applications or further purified by conventional procedures such as washing, extraction and recrystallization from a common organic solvent before being so employed.

The compounds of the present invention, wherein Y represents the 2,5-cyclohexadien-1,4-ylenedinitrilo and characterized by the formula

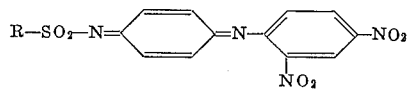

are prepared by oxidizing with lead tetraacetate, the N-[4-(2,4-dinitroanilino)phenyl]sulfonamide compounds prepared as described in the immediately preceding paragraphs. The reaction is carried out in a lower alkanoic acid containing up to 5 carbon atoms such as acetic acid, propionic acid, butyric acid, valeric acid or in a polar solvent such as methanol, ethanol or isopropanol as the reaction medium. In a preferred embodiment, acetic acid is employed as the reaction medium. The reaction proceeds readily at temperatures of from 0 to 110° C. The proportions of the reactants to be employed are not critical, some of the desired product being formed upon contacting the reactants in any proportions. However, in a preferred embodiment the lead tetraacetate is employed in at least equimolar amounts with respect to the N-[4-(2,4-dinitroanilino)phenyl]sulfonamide compound.

In carrying out the reaction, the lead tetraacetate, the N-[4-(2,4-dinitroanilino)phenyl]sulfonamide compounds such as N-[4-(2,4-dinitroanilino)phenyl]-o-toluenesulfonamide,
N-[4-(2,4-dinitroanilino)phenyl]-isopropanesulfonamide,
N-[4-(2,4-dinitroanilino)phenyl]-3,4,5-tribromobenzene-sulfonamide,
N-[4-(2,4-dinitroanilino)phenyl]-m-butylbenzenesul-fonamide and
N-[4-(2,4-dinitroanilino)phenyl]-o-ethylbenzenesulfon-amide are contacted together in the reaction medium in any order or fashion. The reaction mixture can be maintained at the reaction temperature for a short period of time to insure completion of the reaction. The desired N - [4 - (2,4 - dinitrophenylimino) - 2,5-cyclohexadienyl-idene]-sulfonamide product can be obtained as a solid by such conventional procedures as evaporation of the reaction medium or washing the reaction mixture with water. Prior to the latter mentioned washing procedure, it is preferable to reduce any excess Pb$^{+4}$ ion by the addition of a small amount of ethylene glycol. This product can then be employed in pesticidal applications or further purified by such common procedures as recrystallization before being so employed.

The compounds of the present invention wherein Y represents halo-p-phenylenediimino can be prepared by the 1,4-addition of hydrogen halide to a N-[4-(2,4-dinitrophenylimino) - 2,5-cyclohexadienylidene]sulfonamide having the formula

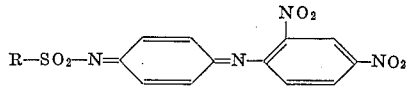

prepared as described in the immediately preceding paragraphs. The contacting of the reactants is carried out at temperatures between −10 and 60° C. with production of the desired product. The reaction can be carried out in the presence of an inert organic liquid as reaction medium. The proportion of the reactants to be employed is not critical as some of the desired product is formed upon contacting the reactants in any proportions. The reaction consumes the reactants in substantially equimolar proportions, and the employment of such proportions is preferred. However, a large excess of hydrogen halide can be employed and will not interfere with the reaction, but it is undesirable from the standpoint of economy.

In carrying out the reaction, the reactants are dispersed in an inert organic liquid such as chloroform, methylene chloride, benzene or ethanol. Thereafter, hydrogen halide gas is bubbled through the dispersion for a short period of time. As the hydrogen halide is bubbled through the dispersion, the desired product ordinarily appears in the reaction mixture as a solid. Following the reaction, the reaction mixture can be cooled to insure substantially complete precipitation of the product and the precipitated product is thereafter separated by such conventional procedures as decantation or filtration. The solid product as thus separated comprises a mixture of the 2- and 3-halosubstituted isomers. This mixture of isomers can then be employed in pesticidal applications. In further procedures, these isomers can be separated one from another by conventional procedures such as fractional crystallization or column chromatography.

In an alternative procedure, the compounds, wherein Y represents halo-p-phenylenediimino can be prepared by reacting a 4-amino-halosulfonanilide compound having the formula

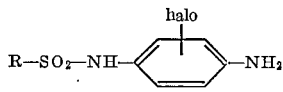

with 2,4-dinitrochlorobenzene. If desired, the reaction can be carried out in the presence of an inert organic liquid as reaction medium. Representative inert organic liquids include benzene, toluene, chloroform and xylene. The reaction takes place readily with the formation of the desired product at temperatures between 50 and 250° C. While the reaction consumes the 4-amino-halosulfonanilide and 2,4-dinitrochlorobenzene in substantially equimolar proportions, it is not necessary to employ such proportions; some of the desired product being formed when contacting the reactants in any proportions. However, the use of the reactants in equimolar proportions is preferred.

In carrying out the reaction, the 4-amino-halosulfonanilide reactant and the 2,4-dinitrochlorobenzene are mixed together in any order or fashion. Representative 4-amino-halosulfonanilide reactants include 4-amino-3-bromo-n-butanesulfonanilide;
4-amino-2-chloro-isopropanesulfonanilide;
4-amino-3-chloroethanesulfonanilide;
N-(4-amino-3-chlorophenyl)-o-toluenesulfonamide;
4-amino-2-chloroisobutanesulfonanilide;
N-(4-amino-3-chlorophenyl)-o-toluenesulfonamide;
N-(4-amino-3-chlorophenyl)-p-ethylbenzenesulfonamide;
N-(4-amino-3-bromophenyl)-m-tert.-butylbenzenesulfonamide;
N-(4-amino-3-bromophenyl)-m-isopropylbenzenesulfonamide;
4-amino-2-bromo-o-ethylbenzenesulfonamide;
N-(4-amino-2-chlorophenyl)-2,3,4,5,6-pentachlorobenzenesulfonamide;
N-(4-amino-2-chlorophenyl)-3,4,5-trimethylbenzenesulfonamide and
4-amino-2-bromo-tert.-butanesulfonanilide.

The reaction mixture can then be maintained at the reaction temperature for a short period of time to assure completion of the reaction. Following the reaction period, the desired product can be separated from the reaction mixture by such conventional procedures as filtration or decantation, evaporation of the reaction solvent, or simply by washing the reaction mixture with a suitable solvent. This solid product can then be further purified by such common procedures as recrystallization from a common solvent.

The following examples are merely illustrative and are not intended to be limiting.

*Example 1.—N-[4-(2,4-dinitroanilino)phenyl] methanesulfonamide*

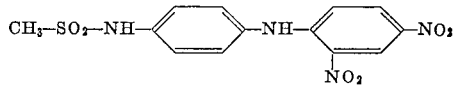

Methanesulfonyl chloride (4.6 grams; 0.040 mole) was added dropwise with stirring to a mixture of 2,4-dinitro-4'-aminodiphenylamine (10.8 grams; 0.040 mole) and 50 milliliters of pyridine. During the addition of the methanesulfonyl chloride, the temperature of the reaction mixture was kept at about 10° C. Following the contacting of the reactants, the temperature of the reaction mixture was allowed to reach room temperature whereupon the reaction mixture was diluted with ice-water. During the dilution procedure, the desired product separated as an oil which solidified upon standing. The solid N-[4-(2,4-dinitroanilino)phenyl]-methanesulfonamide product was removed from the diluted mixture by filtration and thereafter recrystallized from acetonitrile. The red-orange recrystallized product melted at 210–212.5° C. and had carbon, hydrogen, nitrogen and sulfur contents of 44.99 percent, 3.50 percent, 15.7 percent and 9.15 percent, respectively, as compared with the theoretical values of 44.31 percent, 3.43 percent, 15.90 percent and 9.10 percent respectively.

*Example 2.—N-[4-(2,4-dinitroanilino)phenyl]-p-toluenesulfonamide*

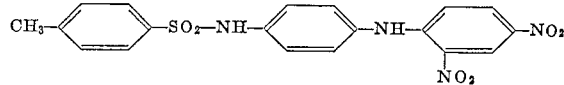

p-Toluenesulfonyl chloride (19.4 grams; 0.102 mole) was added slowly with stirring to a dispersion of 2,4-dinitro-4'-aminodiphenylamine (27.4 grams; 0.100 mole) in 200 milliliters of pyridine. During the addition of the p-toluenesulfonyl chloride, the reaction mixture was maintained at 0° C. Following the contacting of the reactants, the temperature of the reaction mixture was allowed to reach room temperature, whereupon the reaction mixture was diluted with ice water. During the dilution procedure, the N-[4-(2,4-dinitroanilino)phenyl]-p-toluenesulfonamide product separated as an oil which solidified upon standing. This solid product was separated by filtration and recrystallized from nitromethane. The yellow crystals of product obtained on recrystallization melted at 253–255° C. and had carbon, hydrogen, and nitrogen contents of 53.06 percent, 3.65 percent and 13.0 percent, respectively, as compared with the theoretical values of 53.26 percent, 3.77 percent and 13.08 percent, respectively.

*Example 3.—N-[4-(2,4-dinitroanilino)phenyl]-3,4-dichlorobenzenesulfonamide*

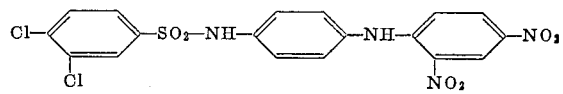

3,4 - dichlorobenzenesulfonyl chloride (14.8 grams; 0.0603 mole) was added slowly with stirring to 2,4-dinitro-4'-aminodiphenylamine (16.2 grams; 0.0591 mole) dispersed in 200 milliliters of pyridine. The reactants were contacted at a temperature between 0° and 5° C. Following the contacting period, the reaction mixture was allowed to come to room temperature. Thereafter, the reaction mixture was diluted with ice-water. During the dilution, the desired product separated as an oily organic phase, which phase solidified shortly thereafter. This solid N-[4-(2,4-dinitroanilino)phenyl] - 3,4-dichlorobenzenesulfonamide product was collected by filtration, air dried and successively recrystallized first from benzene and then from ethanol. The recrystallized product melted at 162–163.5° C. and had carbon, hydrogen and nitrogen contents of 44.84 percent, 2.34 percent and 11.41 percent, respectively, as compared with the theoretical contents of 44.73 percent, 2.50 percent and 11.59 percent, respectively.

*Example 4.—N-[4-(2,4-dinitrophenylimino)-2,5-cyclohexadienylidene]methanesulfonamide*

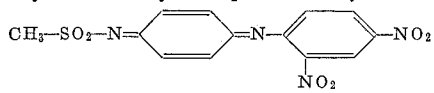

Lead tetraacetate (22.2 grams; 0.0502 mole) was added, with stirring, to a suspension of N-[4-(2,4-dinitroanilino)phenyl]methanesulfonamide (14.7 grams; 0.0418 mole) in 250 milliliters of glacial acetic acid. This reaction mixture was stirred and maintaind at room temperature for 1.5 hours. Thereafter, the temperature of the reaction mixture was elevated to 90° C. and maintained at that temperature for thirty minutes. Following this 30 minute period, the reaction mixture was allowed to cool to room temperature. Four milliliters of ethylene glycol were then added to the reaction mixture with stirring to reduce any excess lead tetraacetate to lead acetate and acetic acid. The reaction mixture was thereafter diluted with water and the solid product, which precipitated during the dilution procedure, was collected by filtration, air dried and recrystallized from acetonitrile. The orange-brown, recrystallized N-[4-(2,4-dinitrophenylimino)-2,5-cyclohexadienylidene] - methanesulfonamide product melted at 202.5–203.5° C. and had carbon, hydrogen and nitrogen contents of 44.74 percent, 3.00 percent and 15.9 percent, respectively as compared with the theoretical contents of 44.57 percent, 2.88 percent and 15.99 percent, respectively.

*Example 5.—N-[4-(2,4-dinitrophenylimino)-2,5-cyclohexadienylidene]-3,4-dichlorobenzenesulfonamide*

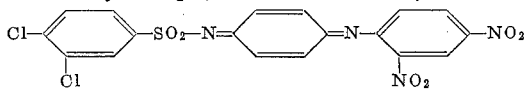

N-[4-(2,4-dinitroanilino)phenyl] - 3,4-dichlorobenzenesulfonamide (7.7 grams; 0.016 mole) and lead tetraacetate (8.5 grams; 0.019 mole) were dispersed in 200 milliliters of glacial acetic acid, and the resulting mixture was stirred at room temperature for 1.5 hours. Thereafter, the stirring was continued and the temperature of the reaction mixture was elevated to 90° C. and maintained thereat for 15 minutes. The reaction mixture was thereafter treated with ethylene glycol, diluted with water and the desired product separated all as described in Example 4. The N-[4-(2,4-dinitrophenylimino)-2,5-cyclohexadienylidene]-3,4-dichlorobenzenesulfonamide product thus obtained was recrystallized from nitromethane and found to melt at 183–184.5° C. and to have carbon, hydrogen and nitrogen contents of 44.77 percent, 1.94 percent and 11.69 percent, respectively, as compared with the theoretical contents of 44.92 percent, 2.09 percent and 11.64 percent, respectively.

*Example 6.—N-[4-(2,4-dinitroanilino)-2-chlorophenyl]methanesulfonamide*

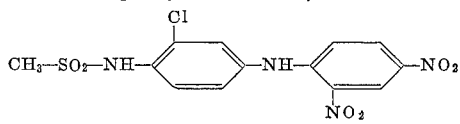

4 - amino-2 - chloromethanesulfonanilide (2.2 grams; 0.010 mole) and 2,4-dinitrochlorobenzene (1.0 gram; 0.0050 mole) were mixed together and heated to a temperature of 150° C. and maintained thereat with stirring for about five minutes. The reaction mixture was then allowed to cool to room temperature and thereafter washed with methanol. As a result of these operations, there was obtained the N-[4-(2,4-dinitroanilino)-2-chlorophenyl]methanesulfonamide product as a crystalline solid residue. This product was recrystallized from acetonitrile and found to melt at 200–202° C., and to have carbon, hydrogen and nitrogen contents of 40.34 percent, 2.80 percent and 14.7 percent, respectively, compared with theoretical contents of 40.37 percent, 2.87 percent and 14.49 percent, respectively.

*Examples 7 and 8.—N-[4-(2,4-dinitroanilino)-3-chlorophenyl]methanesulfonamide and N-[4-(2,4-dinitroanilino)-2-chlorophenyl]methanesulfonamide*

Excess hydrogen chloride was bubbled over a one half hour period into a dispersion of N-[4-(2,4-dinitrophenylimino) - 2,5 - cyclohexadienylidene]methanesulfonamide (10.0 grams; 0.0285 mole) in 600 milliliters of methylene chloride. Following the addition of the hydrogen chloride, the reaction mixture was set aside with stirring at room temperature for 3 hours. The solvent was thereafter removed from the reaction mixture by evaporation under reduced pressure to obtain a light orange crystalline material as a residue. This residue was then dispersed in methanol and the dispersion filtered to separate the yellow crystalline N-[4-(2,4-dinitroanilino)-2-chlorophenyl]methanesulfonamide product as a residue. This residue was recrystallized from acetonitrile.

The recrystallized N-[4-(2,4-dinitroanilino)-2-chlorophenyl]methanesulfonamide product was found to melt at 202–204° C. and to have carbon, hydrogen and nitrogen contents of 40.40 percent, 2.80 percent and 14.3 percent, respectively, as compared with the theoretical contents of 40.37 percent, 2.87 percent and 14.49 percent, respectively. A mixed melting point determination carried out with this product together with the product obtained in Example 6 showed no depression or change in melting point. In addition, infrared and nuclear magnetic resonance spectra of this product and the product of Example 6 were identical.

The filtrate as obtained by filtration of the methanol dispersion, as described in the foregoing paragraph, was subjected to evaporation under reduced pressure to remove low boiling substituents and obtain the N-[4-(2,4-dinitroanilino)-3-chlorophenyl]methanesulfonamide product as an orange colored crystalline residue. This product was recrystallized from methanol and found to melt at 202–205° C. and to have carbon, hydrogen and nitrogen contents of 40.33 percent, 2.86 percent and 14.35 percent, respectively, as compared with the theoretical contents of 40.37 percent, 2.87 percent and 14.99 percent, respectively. A mixture of this material and an approximately equal amount of the N-[4-(2,4-dinitroanilino)-2-chlorophenyl]methanesulfonamide was prepared and the melting point of this mixture measured. The melting point of this mixture was materially below the melting point of either component.

In exactly analogous fashion, the following compounds of the present invention are prepared.

N-[4 - (2,4 - dinitroanilino)phenyl]ethanesulfonamide (melting point 197–199° C.) by reacting together ethanesulfonyl chloride and 2,4-dinitro-4'-aminodiphenylamine.

N-[4-(2,4-dinitroanilino)phenyl]-tert.-butane - sulfonamide (molecular weight 394) by reacting together tert.-butanesulfonyl chloride and 2,4-dinitro-4'-amino-diphenylamine.

N-[4-(2,4 - dinitroanilino)phenyl]-3,5-dipropylbenzenesulfonamide (molecular weight 498) by reacting together 3,5-dipropylbenzenesulfonyl chloride and 2,4-dinitro-4'-aminodiphenylamine.

N-[4-(2,4-dinitroanilino)phenyl] - 3,4,5 - trimethylbenzenesulfonamide (molecular weight 456) by reacting together 3,4,5-trimethylbenzenesulfonyl chloride and 2,4-dinitro-4'-aminodiphenylamine.

N-[4-(2,4-dinitroanilino)phenyl] - p - bromobenzenesulfonamide (melting point at 199–201° C.) by reacting together p-bromobenzenesulfonyl chloride and 2,4-dinitro-4'-aminodiphenylamine.

N-[4-(2,4-dinitrophenylimino) - 2,5 - cyclohexadienylidene]-p-toluenesulfonamide (melting point 190–191° C.) by reacting together lead tetraacetate and N-[4-(2,4-dinitroanilino)phenyl]-p-toluenesulfonamide in glacial acetic N-[4-(2,4-dinitrophenylimino) - 2,5 - cyclohexadienylidene]-p-tert.-butylbenzenesulfonamide (molecular weight 468) by reacting together lead tetraacetate and N-[4-(2,4-dinitroanilino)phenyl]-p-tert.-butylbenzenesulfonamide in glacial acetic acid.

N-[4-(2,4-dinitrophenylimino) - 2,5 - cyclohexadienylidene]-p-bromobenzene sulfonamide (melting point 168–170° C.) by reacting together lead tetraacetate and N-[4-(2,4-dinitroanilino)phenyl]-p - bromobenzenesulfonamide in glacial acetic acid.

N-[4-(2,4-dinitroanilino) - 3 - bromophenyl]-methanesulfonamide (molecular weight 432) by reacting together 4-amino-3-bromomethanesulfonanilide and 2,4-dinitrobromobenzene.

N-[4-(2,4-dinitroanilino) - 2 - chlorophenyl]-p-ethylbenzenesulfonamide (molecular weight 477) by reacting together N-[4-(2,4-dinitrophenylimino) - 2,4 - cyclohexadienylidene]-p-ethylbenzenesulfonamide and hydrogen chloride.

N-[4-(2,4- - dinitrophenylimino) - 2,5 - cyclohexadienylidene]-3,4,5-tribromobenzenesulfonamide (molecular weight 648) by reacting together lead tetraacetate and N-[4-(2,4 - dinitroanilino)phenyl]-3,4,5-tribromobenzenesulfonamide in glacial acetic acid.

N-[4-(2,4-dinitrophenylimino) - 2,5 - cyclohexadienylidene]-2,3,4,5,6-pentachlorobenzenesulfonamide (molecular weight 584) by reacting together lead tetraacetate and N-[4-2,4-dinitroanilino)phenyl] - 2,3,4,5,6 - pentachlorobenzenesulfonamide.

N-[4-(2,4-dinitrophenylimino) - 2,5 - cyclohexadienylidene]-2,3,4,5,6-pentamethylbenzenesulfonamide (molecular weight 482) by reacting together lead tetraacetate and N-[4-(2,4-dinitroanilino)phenyl] - 2,3,4,5,6 - pentamethylbenzenesulfonamide.

The compounds of the present invention are useful as dyes for polyolefins. These compounds can be dispersed in the polyolefin with or without the aid of a surface active agent. In other operations these compounds can be dissolved in an organic solvent such as o-xylene, xylol, benzene, toluene, acetone, methanol or ethanol. The resulting solution can then be added to the polyolefin. The dyed polyolefin can then be cast into a film or molded into the desired shape. In a representative operation, 0.1 gram of N-[4-(2,4-dinitroanilino)phenyl]-p-bromobenzenesulfonamide is dissolved in 450 milliliters of o-xylene. The solution is then heated to 120° C., whereupon 100 grams of polyethylene is dissolved therein. The mixture is then cast into a film from which the solvent is evaporated leaving a bright yellow film of polyethylene. Upon aging, there is observed no deleterious oxidative effect upon the dyed polyethylene product attributable to the presence of the dye.

The compounds of the present invention are also useful as pesticides for the control of various insect, crustacean, arachnid and helminth pests. For such use, the unmodified compound can be used. Alternatively, the compound can be dispersed on an inert finely divided solid and the resulting preparation employed as a dust. Also, such preparations can be dispersed in water with or without the aid of a wetting agent and the resulting aqueous dispersions employed as sprays. In other procedures, the compound can be employed in oil or other solvents or as a constituent of solvent-in-water or water-in-solvent emulsions or as aqueous dispersions thereof which can be applied as a spray, drench or wash. In representative operations, aqueous compositions containing N-[4-(2,4-dinitroanilino)phenyl]-p-toluenesulfonamide at a concentration of 1000 parts per million by weight give substantially complete kills of two-spotted spider mites. In other representative operations, complete kills of daphnia are obtained when N-[4-(2,4-dinitrophenylimino)-2,5-cyclohexadienylidene]-3,4-dichlorobenzenesulfonamide is added to their aqueous environment at concentrations of 2 parts per million by weight.

The 4-amino-2- (or 3-) halo-(R-sulfonanilide) materials employed as starting materials in the present invention and corresponding to the formula

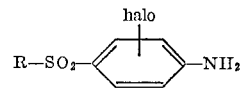

are prepared in accordance with known procedures. In such operations, 2- (or 3-) halo-4-nitroaniline is reacted with R-sulfonyl chloride in the presence of an organic liquid such as pyridine to produce 2- (or 3-) halo-4-nitro-N,N-bis(R-sulfonyl)aniline. This product is then heated with an ethanolic solution of sodium ethoxide to remove one of the R-sulfonyl groups and to produce 2- (or 3-) halo-4-nitro(R-sulfonanilide). The 2- (or 3-) halo-4-nitro(R-sulfonanilide) compound is then reduced in a hydrogen atmosphere in the presence of platinum oxide catalyst to prepare 4-amino-2- (or 3-) halo(R-sulfonanilide). The catalytic reduction of the 4-nitro group takes place under pressure (about 60 p.s.i.). Thereafter the desired product is isolated by conventional procedures.

I claim:
1. The compound having the formula

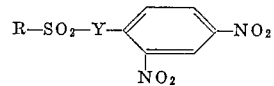

wherein R represents a member of the group consisting of lower alkyl, phenyl, lower alkyl phenyl and halophenyl; and Y represents a member of the group consisting of p-phenylenediimino, monohalo-p-phenylenediimino and 2,5-cyclohexadien-1,4-ylenedinitrilo.

2. N-[4-(2,4 - dinitroanilino)phenyl]-p-toluenesulfonamide.

3. N-[4-(2,4 - dinitroanilino)phenyl]methanesulfonamide.

4. N-[4-(2,4-dinitrophenylimino)-2,5-cyclohexadienylidene]-3,4-dichlorobenzenesulfonamide.

5. N-[4-(2,4-dinitroanilino) - 3-chlorophenyl]-methanesulfonamide.

6. N-[4-(2,4-dinitrophenylimino) - 2, 5 - cyclohexadienylidene]-p-toluenesulfonamide.

No references cited.

WALTER A. MODANCE, *Primary Examiner.*
HARRY I. MOATZ, *Assistant Examiner.*